United States Patent
Chen

(10) Patent No.: US 6,590,775 B2
(45) Date of Patent: Jul. 8, 2003

(54) FASTENER FOR SECURING A DATA STORAGE DEVICE TO A BRACKET

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 101 days.

(21) Appl. No.: 09/891,059

(22) Filed: Jun. 25, 2001

(65) Prior Publication Data

US 2002/0172014 A1 Nov. 21, 2002

(30) Foreign Application Priority Data

May 18, 2001 (TW) .......................... 090208132

(51) Int. Cl.⁷ ................................. G06F 1/16

(52) U.S. Cl. .................... 361/725; 248/694; 364/708.1; 361/685

(58) Field of Search ................. 361/725, 724, 361/686, 683–685; 248/27.1, 27.3, 201, 694; 364/708.1

(56) References Cited

U.S. PATENT DOCUMENTS

| 6,256,195 | B1 | * | 7/2001 | Liao ........................... 361/685 |
| 6,313,985 | B1 | * | 11/2001 | Chen et al. ................. 361/685 |
| 6,318,679 | B1 | * | 11/2001 | Yang et al. ................ 248/27.1 |

* cited by examiner

*Primary Examiner*—Darren Schuberg
*Assistant Examiner*—Hung Van Duong
(74) *Attorney, Agent, or Firm*—Wei Te Chung

(57) ABSTRACT

A fastener (40) securing a data storage device (30) to a bracket (10) includes a body (42) and a handle (60). The body includes a base (43) and a head (56) extending from the base. A protrusion (52) is outwardly formed from the base, for engaging with the bracket. A pair of locating pins (46) extends away from a bottom portion of the body, for engaging with the data storage device. The head defines a latch hole (58) therein. The handle has a connection portion (62). A pair of guide flanges (66) is inwardly formed from upper and lower edges of the connection portion. The guide flanges cooperate with the connection portion to receive the head of the body therebetween. A resilient latch (68) is formed at the connection portion between the guide flanges, to be received in the latch hole. Thus, the handle is connected to the body.

14 Claims, 5 Drawing Sheets

FASTENER FOR SECURING A DATA STORAGE DEVICE TO A BRACKET

BACKGROUND OF THE INVENTION

1. Field of the Invention

The present invention relates to a fastener, and more particularly to a fastener which accurately orientates a data storage device to a bracket.

2. Description of Related Art

Typically, a date storage device is directly secured to a bracket using screws. Installation and removal of screws with a tool is unduly complicated and laborious, and reduces the efficiency of assembly in mass production facilities.

To overcome the above shortcomings, a pair of slideways is frequently formed in a bottom portion of opposite side walls of the bracket. A sliding rail is attached to each side of the data storage device. Thus, the data storage device can readily slide into and be secured to the bracket.

Unfortunately, the sliding rails themselves are secured to the data storage device with screws. Thus use of the sliding rails does not simplify the assembly procedure. Furthermore, each slideway of the bracket comprises a pair of supporting flanges stamped inwardly from the side walls of the bracket. The flanges receive the sliding rails thereon, and must be spaced far enough apart to ensure that the data storage device slides comfortably into the bracket. As a result, the data storage device is prone to accidentally move in horizontal directions within the bracket. Because the sliding rails sit on the flanges by means of gravity alone, the data storage device is also prone to accidentally move in vertical directions within the bracket. This is particularly so when the bracket is subjected to vibration during normal operation. This all too frequently results in damage to any of the sliding rails, the bracket and the data storage device.

Examples of the abovementioned mechanisms are disclosed in Taiwan Patent Applications Nos. 85210034, 86208947 and 86212064.

SUMMARY OF THE INVENTION

Accordingly, an object of the present invention is to provide a fastener which accurately orientates a data storage device to a bracket.

In order to achieve the object set out above, a fastener of the present invention for securing a data storage device to a bracket comprises a body and a handle. The body includes a base and a head extending from the base. A protrusion is outwardly formed on the base for being engagingly received in the bracket. A slot is defined in the base of the fastener for facilitating engagement with the bracket. A pair of locating pins extends away from a bottom of the body for engaging with the data storage device. The head defines a latch hole therein. The handle has a connection portion. A pair of guide flanges is inwardly formed from upper and lower edges of the connection portion. The guide flanges cooperate with the connection portion to receive the head of the body therebetween. A resilient latch is formed at the connection portion between the guide flanges to be received in the latch hole. Thus, the handle is connected to the body.

Other objects, advantages and novel features of the present invention will become more apparent from the following detailed description when taken in conjunction with the accompanying drawings.

DETAILED DESCRIPTION OF THE INVENTION

Figure 1:
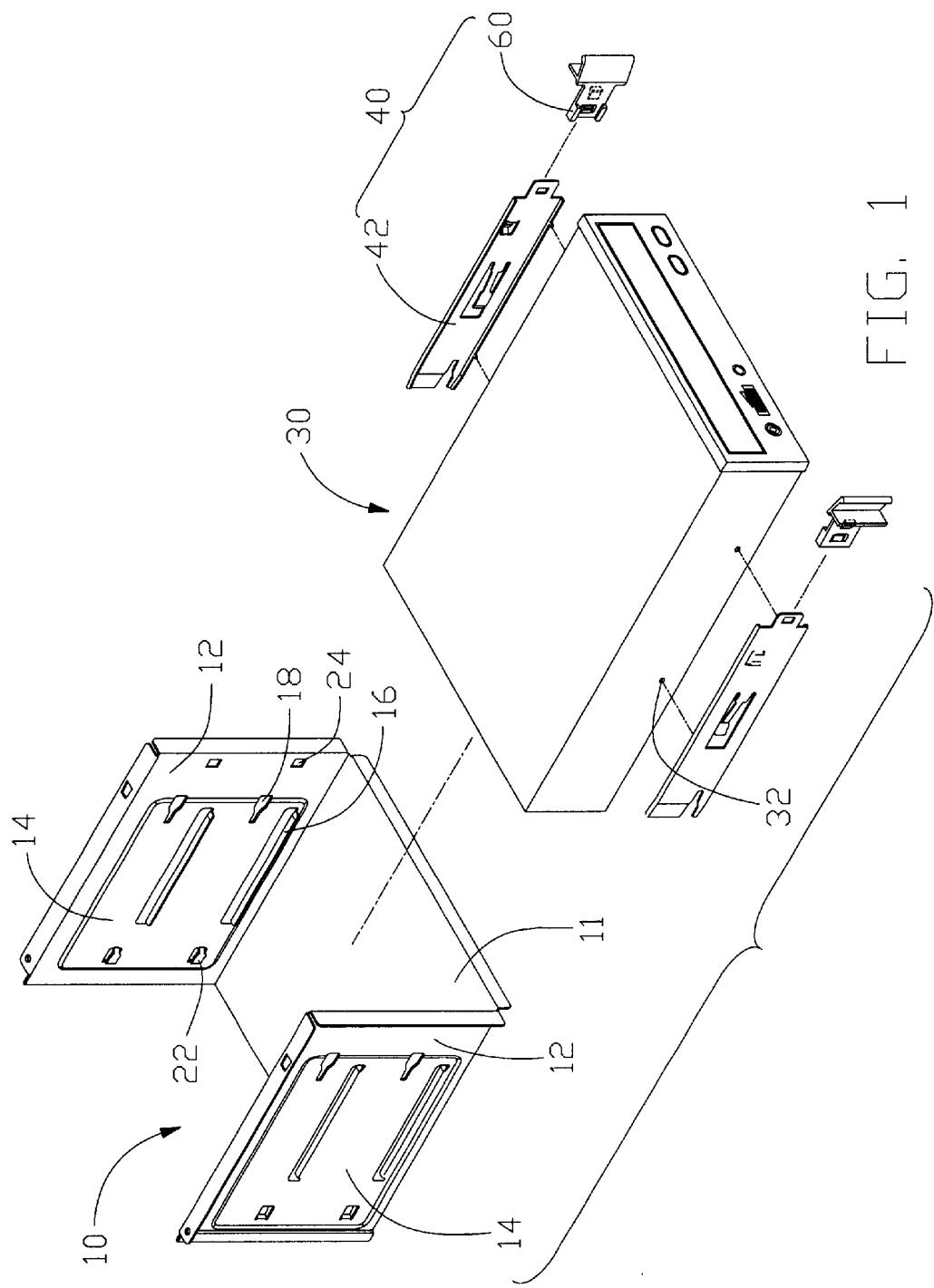
FIG. 1 is an exploded view of a pair of fasteners in accordance with the present invention, for securing a data storage device to a bracket.

Reference will now be made to the drawing figures to describe the present invention in detail.

Referring to FIG. 1, a fastener 40 in accordance with a preferred embodiment of the present invention comprises a body 42 and a handle 60. A pair of the fasteners 40 secures a data storage device 30 to a bracket 10. The data storage device 30 defines a pair of through holes 32 in each of respective opposite sides thereof.

The bracket 10 is substantially U-shaped, and comprises a bottom panel 11 and a pair of parallel side panels 12 extending vertically upwardly from opposite sides of the bottom panel 11. An inner portion 14 is inwardly formed from each side panel 12. A plurality of horizontal support flanges 16 is stamped inwardly from each inner portion 14, for supporting data storage devices 30 thereon. A plurality of first slots 18 is defined in each inner portion 14 at a front vertical junction of the inner portion 14 and the side panel 12. Each first slot 18 is disposed slightly higher than its corresponding support flange 16, and comprises a front wide portion (not labeled) and a rear narrow portion (not labeled). A plurality of first protrusions 22 is inwardly formed at a rear section of each inner portion 14. Each first protrusion 22 is disposed slightly higher than its corresponding support flange 16. A plurality of locating holes 24 is defined in a front section of each side panel 12.

Figure 2:
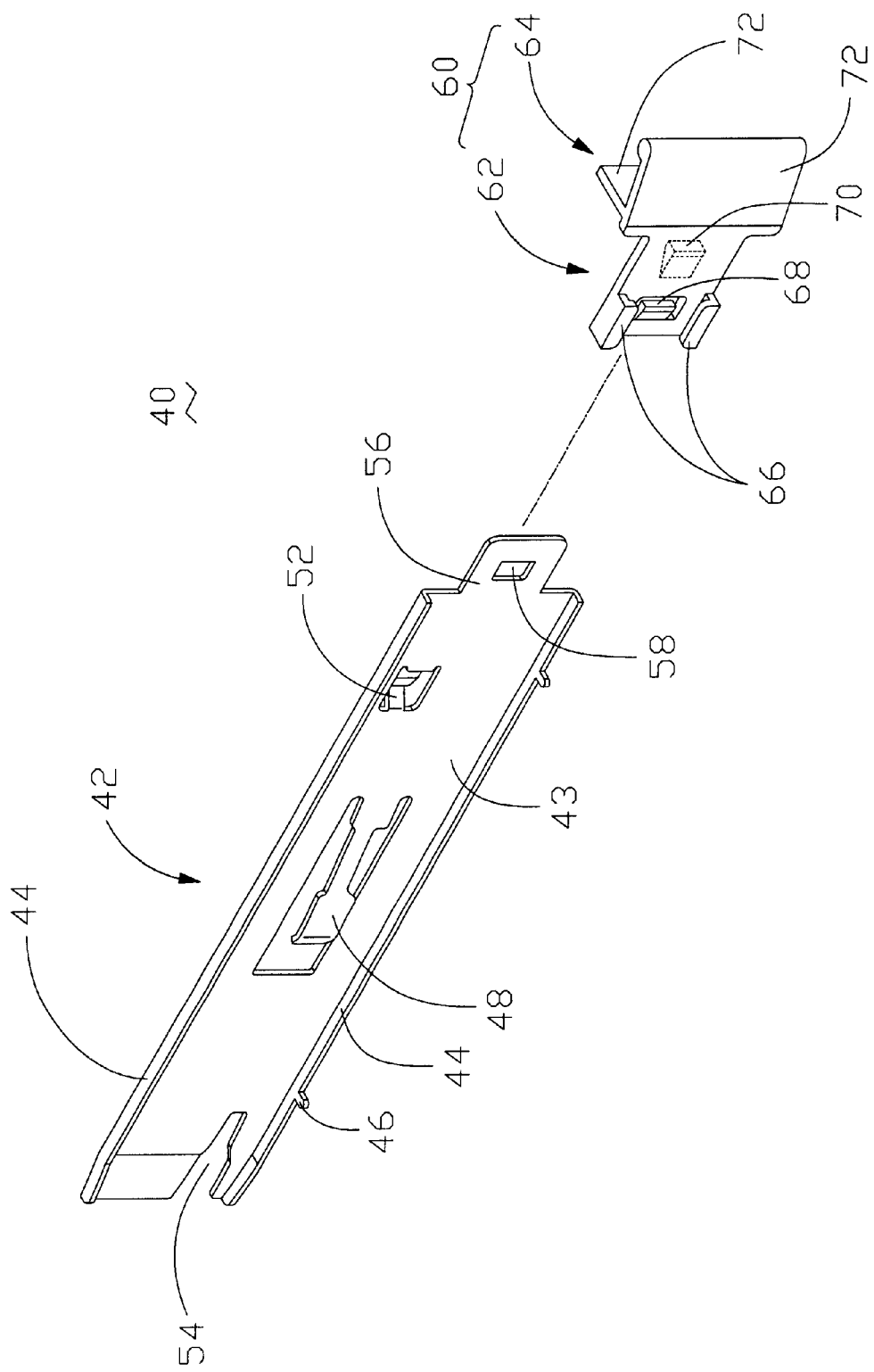
FIG. 2 is a perspective view of the fastener shown at right in FIG. 1.
Figure 3:
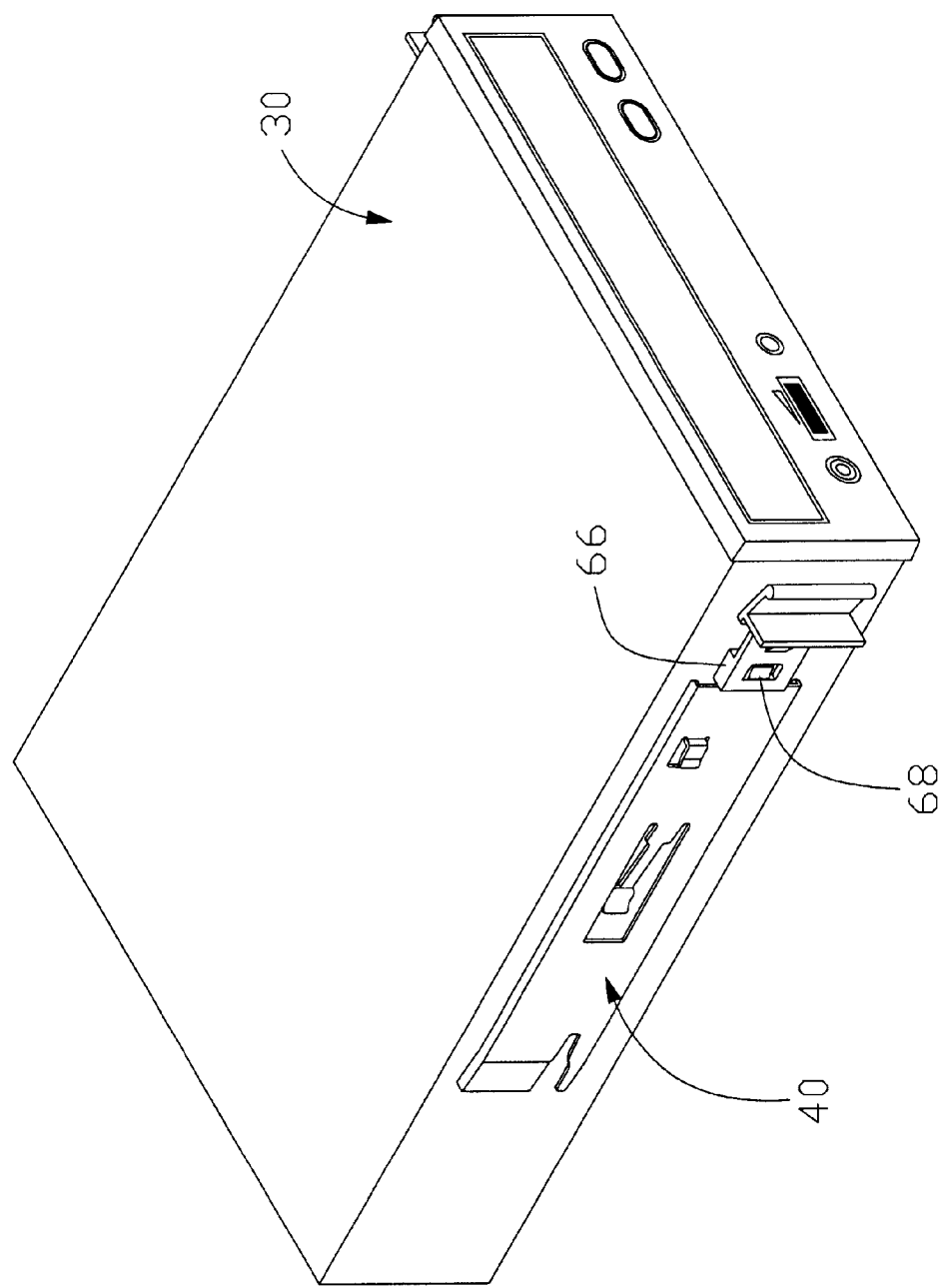
FIG. 3 is an assembled view of the fasteners and the data storage device of FIG. 1.
Figure 4:
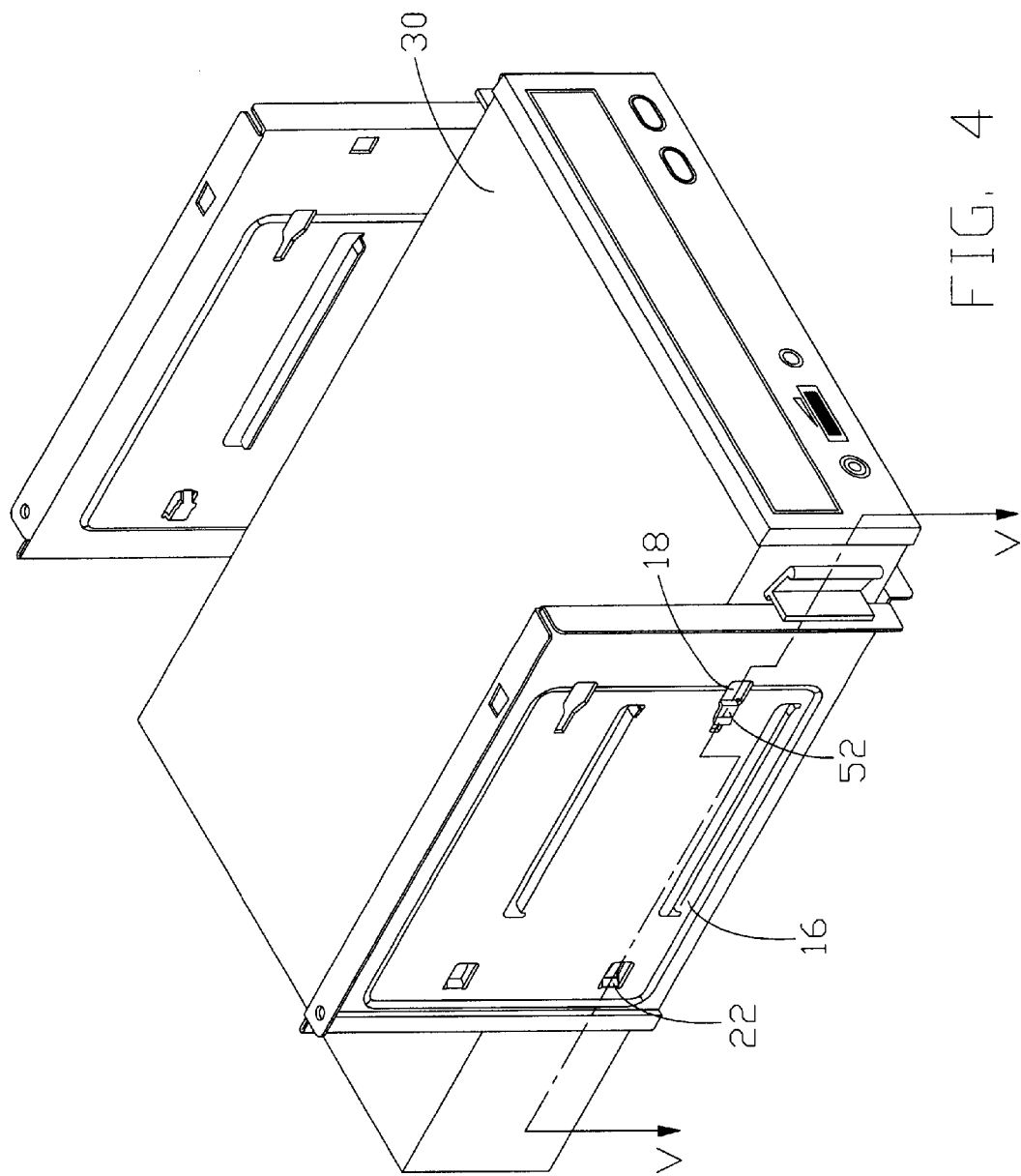
FIG. 4 is an assembled view of FIG. 1.
Figure 5:
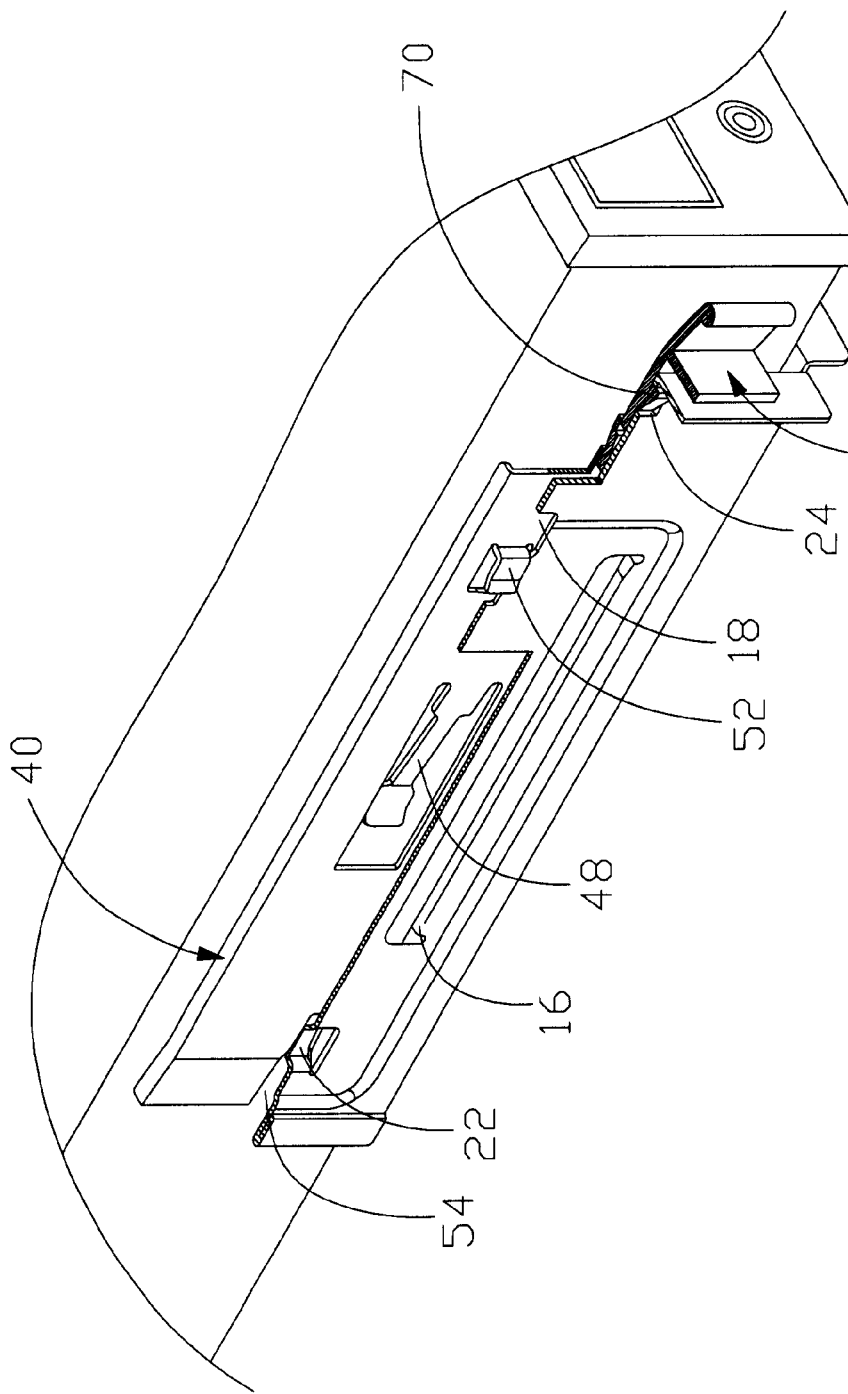
FIG. 5 is a close-up view of FIG. 4, particularly showing a cutaway view of one side of the bracket and a partial cutaway view of one fastener attached thereto, said cutaway views being taken along line V—V of FIG. 4.

Referring particularly to FIG. 2, the body 42 of each fastener 40 comprises an elongated base 43 and a head 56 extending from a front of the base 43. A latch hole 58 is defined in the head 56. A pair of ribs 44 extends horizontally inwardly from lower and upper edges of the base 43 respectively. A pair of spaced locating pins 46 further extends horizontally inwardly from the lowermost rib 44, for insertion into the through holes 32 of the data storage device 30. A spring arm 48 extends inwardly from a central portion of the base 43, for pressing against the corresponding side of the data storage device 30. A second protrusion 52 is outwardly formed from the base 43 between the spring arm 48 and the head 56, for engagement in the rear narrow portion (not labeled) of the corresponding first slot 18 of the bracket 10. A second slot 54 is defined in a rear edge of the body 42, for receiving the corresponding first protrusion 22 of the bracket 10. The second slot 54 comprises a rear wide portion (not labeled) and a front narrow portion (not labeled), for engagingly receiving the corresponding first protrusion 22 of the bracket 10.

The handle 60 comprises a connection portion 62, and an operation portion 64 joined to a front of the connection portion 62. A pair of guide flanges 66 is inwardly formed from upper and lower edges of a rear section of the connection portion 62, for cooperating with the connection portion 62 to engagingly receive the head 56 of the body 42. A resilient latch 68 is inwardly formed from the connection portion 62 between the guide flanges 66, for engaging in the latch hole 58 of the body 42. The operation portion 64 is substantially L-shaped, and comprises a pair of walls 72 generally perpendicular to each other. A locating wedge 70 is formed on an outer surface of the operation portion 64, for engaging in the corresponding locating hole 24 of the bracket 10.

In assembly of each fastener 40, the guide flanges 66 and connection portion 62 of the handle 60 cooperate to slidingly receive the head 56 of the body 42 therebetween. The resilient latch 68 of the handle 60 resiliently snaps into the latch hole 58 of the body 42. Thus, the handle 60 is securely connected to the body 42.

Referring to FIGS. 1 to 5, in use, the fasteners 40 are placed against the opposite sides of the data storage device 30. The locating pins 46 of the fasteners 40 are interferentially inserted into the through holes 32 of the data storage device 30. The assembly of the data storage device 30 and the fasteners 40 is pushed into the bracket 10 from a front of the bracket 10. The support flanges 16 thereby support the data storage device 30 thereon. The second slots 54 and the second protrusions 52 of the fasteners 40 respectively engage with the corresponding first protrusions 22 and the first slots 18 of the bracket 10. The locating wedges 70 of the fasteners 40 are engagingly received in the locating holes 24 of the bracket 10. The spring arms 48 of the fasteners 40 resiliently press against the sides of the data storage device 30. The data storage device 30 is thereby firmly held in the bracket 10.

In removal of the data storage device 30 from the bracket 10, the operation portions 64 of the fasteners 40 are simultaneously squeezed inwardly toward each other. This causes the locating wedges 70 of the handle 60 to disengage from the locating holes 24 of the bracket 10. The assembly of the data storage device 30 and the fasteners 40 is then withdrawn from the bracket 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastener for securing a data storage device to a bracket, comprising:
   a body comprising a base and a head extending from the base, a protrusion being outwardly formed from a front portion of the base for being engagingly received in a first slot of the bracket, at least one locating pin extending away from a lower edge of the body for engaging with the data storage device, the head defining a latch hole therein; and
   a handle having a connection portion, a pair of guide flanges inwardly formed from upper and lower edges of the connection portion, and a resilient latch formed at the connection portion between the guide flanges, the guide flanges cooperating with the connection portion to receive the head of the body therebetween, the resilient latch engaging with the latch hole of the body such that the handle is connected to the body.

2. The fastener as described in claim 1, wherein a second slot is defined in a rear of the body of the fastener for engagingly receiving a part of the bracket.

3. The fastener as described in claim 1, wherein a rib extends inwardly from the lower edge of the body, and wherein the at least one locating pin extends horizontally from the rib.

4. The fastener as described in claim 1, wherein the handle further comprises an operating portion in front of the connecting portion.

5. The fastener as described in claim 1, wherein a spring arm extends inwardly from a central portion of the base, for resiliently pressing against the data storage device.

6. The fastener as described in claim 2, wherein the second slot is exposed to a rear end of the body and consists of a wide rear portion and a narrow front portion, the narrow front portion engagingly receiving the part of the bracket.

7. The fastener as described in claim 4, wherein the operating portion outwardly forms a locating wedge, for being engagingly received in the bracket.

8. A data storage device assembly, comprising:
   a data storage device having a pair of opposite sides;
   a bracket comprising a bottom panel and a pair of side panels extending vertically from opposite sides of the bottom panel, each side panel defining at least one first slot and at least one locating hole therein, each side panel further having a support flange for supporting the data storage device thereon; and
   a pair of fasteners being attached at the opposite sides of the data storage device, each fastener outwardly forming a protrusion and a locating wedge respectively engaging in the at least one first slot and the at least one locating hole of the bracket to secure the data storage device to the bracket, wherein the first slot comprises a front wide portion and a rear narrow portion, and the protrusion engages in the rear narrow portion.

9. The data storage device assembly as described in claim 8, wherein a second slot is defined in each fastener, and wherein at least one protrusion is inwardly formed from each side panel of the bracket for engaging in the second slot of the corresponding fastener, the second slot comprising a rear wide portion and a front narrow portion, the protrusion of the bracket engaging in the front narrow portion of the second slot.

10. The data storage device as described in claim 8, wherein a spring arm extends inwardly from each fastener, for resiliently pressing against the data storage device.

11. The data storage device as described in claim 8, wherein each of the opposite sides of the data storage device defines at least one through hole therein, and wherein each fastener has at least one locating pin for insertion into the at least one through hole.

12. A data storage device assembly, comprising:
   a data storage device having a pair of opposite sides;
   a pair of fasteners being attached to the opposite sides of the data storage device, each fastener having a first protrusion and a first slot comprising a first wide portion and a first narrow portion communicating with each other; and
   a U-shaped bracket receiving the data storage device with the fasteners therein, the bracket having two side panels respectively engaging with the fastener, in which each of the side panels comprises a second protrusion and a second slot having a second wide portion and a second narrow portion communicating with each other, the first protrusion engaging in the second narrow portion of the second slot and the second protrusion engaging in the first narrow portion of the first slot.

13. The data storage device assembly as described in claim 12, wherein the first wide portion of the first slot is located at a rear of the first narrow portion of the first hole, while the second wide portion of the second slot is located at a front of the second narrow portion of the second slot.

14. The data storage device assembly as described in claim 13, wherein the first slot is located in front of the second slot.

* * * * *